United States Patent
Kim et al.

(10) Patent No.: US 7,660,970 B2
(45) Date of Patent: Feb. 9, 2010

(54) REGISTER ALLOCATION METHOD AND SYSTEM FOR PROGRAM COMPILING

(75) Inventors: Suk-jin Kim, Seoul (KR); Jeong-wook Kim, Seongnam-si (KR); Hong-seok Kim, Seongnam-si (KR); Soo-jung Ryu, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 11/506,887

(22) Filed: Aug. 21, 2006

(65) Prior Publication Data

US 2007/0169032 A1 Jul. 19, 2007

(30) Foreign Application Priority Data

Nov. 9, 2005 (KR) .................... 10-2005-0107084

(51) Int. Cl.
*G06F 9/30* (2006.01)
*G06F 9/34* (2006.01)

(52) U.S. Cl. .................. 712/217; 712/225; 712/241; 717/140

(58) Field of Classification Search ................ 712/217, 712/218, 225, 241; 717/140, 153
See application file for complete search history.

(56) References Cited

U.S. PATENT DOCUMENTS

| | | | | |
|---|---|---|---|---|
| 5,564,031 A * | 10/1996 | Amerson et al. | ............ | 711/209 |
| 6,230,317 B1 * | 5/2001 | Wu | ............ | 717/161 |
| 6,321,330 B1 * | 11/2001 | Doshi et al. | ............ | 712/241 |
| 6,507,947 B1 * | 1/2003 | Schreiber et al. | ............ | 717/160 |
| 6,651,247 B1 * | 11/2003 | Srinivasan | ............ | 717/161 |
| 6,948,158 B2 * | 9/2005 | Van Gageldonk et al. | ... | 717/140 |
| 6,986,131 B2 * | 1/2006 | Thompson et al. | ............ | 717/160 |
| 7,272,832 B2 * | 9/2007 | Gardner | ............ | 718/105 |
| 7,316,012 B2 * | 1/2008 | Muthukumar | ............ | 717/161 |
| 7,395,419 B1 * | 7/2008 | Gonion | ............ | 712/241 |
| 2002/0144092 A1 * | 10/2002 | Topham et al. | ............ | 712/217 |
| 2003/0101322 A1 * | 5/2003 | Gardner | ............ | 711/163 |
| 2003/0233643 A1 * | 12/2003 | Thompson et al. | ............ | 717/161 |
| 2003/0237080 A1 * | 12/2003 | Thompson et al. | ............ | 717/161 |
| 2005/0071607 A1 * | 3/2005 | Muthukumar | ............ | 712/227 |
| 2006/0004996 A1 * | 1/2006 | Gonion | ............ | 712/241 |

FOREIGN PATENT DOCUMENTS

EP 1124182 A2 2/2001

* cited by examiner

*Primary Examiner*—Aimee J Li
(74) *Attorney, Agent, or Firm*—Sughrue Mion, PLLC

(57) ABSTRACT

Disclosed is a data processing system and method. The data processing method determines the number of static registers and the number of rotating registers for assigning a register to a variable contained in a certain program, assigns the register to the variable based on the number of the static registers and the number of the rotating registers, and compiles the program. Further, the method stores in the special register a value corresponding to the number of the rotating registers in the compiling operation, and obtains a physical address from a logical address of the register based on the value. Accordingly, the present invention provides an aspect of efficiently using register files by dynamically controlling the number of rotating registers and the number of static registers for a software pipelined loop, and has an effect capable of reducing the generations of spill/fill codes unnecessary during program execution to a minimum.

24 Claims, 5 Drawing Sheets

REGISTER ALLOCATION METHOD AND SYSTEM FOR PROGRAM COMPILING

CROSS-REFERENCE TO RELATED APPLICATIONS

This application claims benefit under 35 U.S.C. §119(a) of Korean Patent Application No. 10-2005-0107084, filed on Nov. 9, 2005, in the Korean Intellectual Property Office, the entire contents of which are incorporated herein by reference.

BACKGROUND OF THE INVENTION

1. Field of the Invention

Apparatuses and methods consistent with the present invention relate to data processing systems and methods, and more particularly, to data processing systems and methods capable of dynamically controlling the number of rotating register files for a software pipelined loop.

2. Description of the Related Art

In general, a loop program having a certain number of iteration times can be completed in fewer cycles when different iterations are performed in parallel with software pipelining applied than when sequentially performed one iteration after another.

Figure 1A:
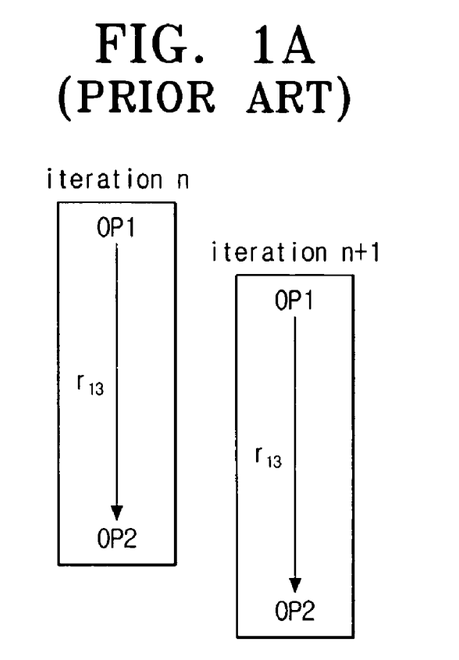
FIGS. 1A and 1B are views for explaining a rotating register file supporting a software pipelining method.

However, when the software pipelining method is applied, the lifetime of an identical variable can be overlapped in different iterations, which causes a problem of conflict of registers in use. For example, as shown in FIG. 1A, if a value created by OP1 is used by OP2, the value can be communicated by a register r13. However, the lifetime of the value stored in the register r13 is overlapped in the $n^{th}$ and $(n+1)^{th}$ iterations of a loop. Accordingly, the value created by OP1 of the $(n+1)^{th}$ iteration is newly stored in the register r13 before OP2 of the $n^{th}$ iteration uses the value created by OP1 of the $n^{th}$ iteration, which causes a problem since the OP2 of the $n^{th}$ iteration uses an incorrect value.

In order to solve such a problem, renaming a register is needed. The register renaming methods include the 'Modulo Variable Expansion (MVE)' method supporting register renaming in a software manner and methods supporting register renaming in a hardware renaming by using a rotating register file.

Figure 1B:
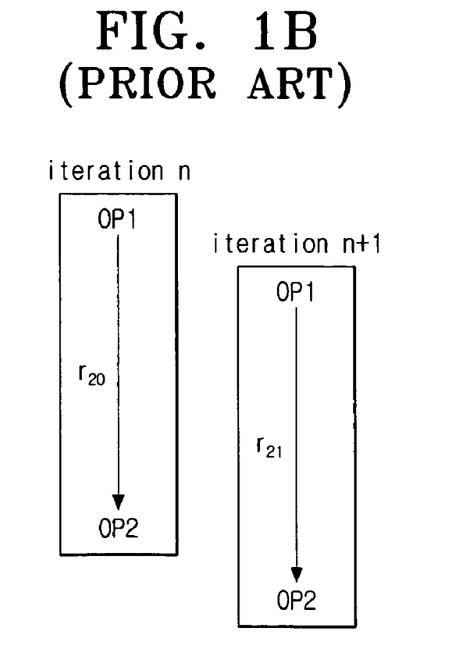

FIG. 1B is a view for showing the use of a rotating register file. In FIG. 1B, the sum of a logical register number defined in an instruction and a value (RRB: Rotation Register Base) corresponding to the number of current iteration times stored in a base register is used as a new register number. Here, the RRB value is incremented or decremented by one for every iteration in the wrap around manner.

For example, in FIG. 1B, if the RRB is 7 in the $n^{th}$ iteration, the RRB in the $(n+1)^{th}$ iteration becomes 8. Therefore, the logical register r13 becomes a physical register r20 in the $n^{th}$ iteration, and the logical register r13 becomes a physical register r21 in the $(n+1)^{th}$ iteration. Thus, the value created by OP1 of the $n^{th}$ iteration and the value created by OP1 of the $(n+1)^{th}$ iteration are written in different physical registers r20 and r21, respectively, and thus the above-mentioned problem can be solved.

On the other hand, conventionally, the number of static registers and rotating registers forming a register file is designed fixed and unchanged in the hardware manner. However, since the number of needed static registers is different from the number of the rotating registers for every program loop, it can occur that registers necessary while looping become insufficient. In this case, the system performance is degraded since a spill/fill code is generated to temporarily move the values stored in registers to a memory and then read the values again into the registers.

Figure 2:
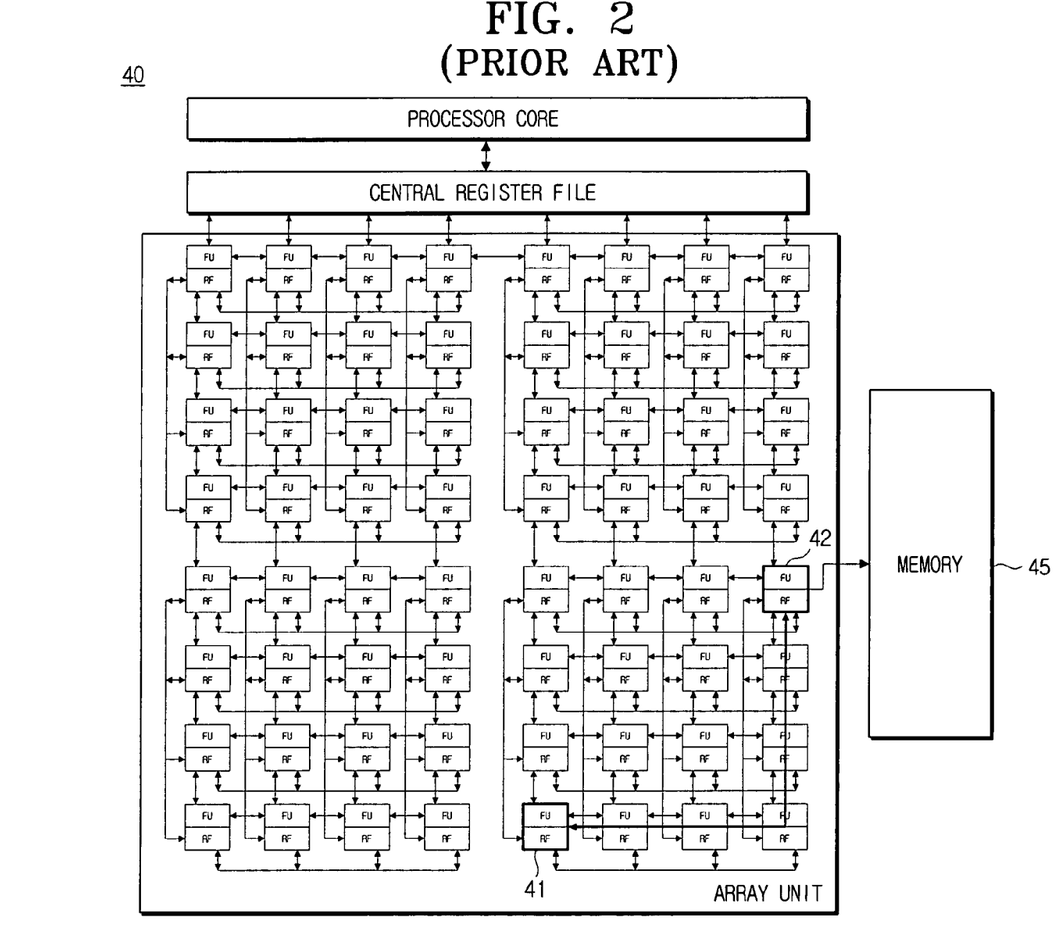
FIG. 2 is a view for showing a conventional loop accelerator.

Specifically, in the coarse-grain loop accelerator 40 shown in FIG. 2, not all the data processing cells contain a load/store unit that loads data from the memory 45 or stores data in the memory 45. Accordingly, when a spill/fill code is generated in a distributed register file (RF) of a data processing cell 41 that does not contain a load/store unit, there exists a problem of severely degrading the performance of the accelerator 40 since the data processing cell 41 loads or stores data from or into the memory 45 through a data processing cell 42 equipped with a load/store unit.

SUMMARY OF THE INVENTION

An aspect of the present invention provides a data processing system and method capable of more efficiently using register files by dynamically controlling the number of rotating registers and the number of static registers for a software pipelined loop.

The foregoing and other aspects are realized by providing a data processing method, comprising determining the number of static registers and the number of rotating registers for assigning a register to a variable contained in a certain program, assigning the register to the variable based on the number of the static registers and the number of the rotating registers, and compiling the program; and executing the compiled program.

Here, preferably, but not necessarily, the number of static registers and the number of rotating registers are determined such that the number of spill/fill codes to be generated is minimized during the executing of the compiled program.

Further, the number of the static registers and the number of the rotating registers are preferably, but not necessarily, determined for every loop contained in the program.

Further, the data processing method can include adding to the program, prior to the compiling of the program, an instruction which instructs storing in a special register a value corresponding to the number of determined rotating registers.

Further, the executing of the compiled program can include obtaining a physical address for the register from a logical address of the register based on the value stored in the special register.

Further, the data processing method can further comprise accessing the register corresponding to the obtained physical address.

Here, the obtaining of the physical address may include comparing the logical address with the value stored in the special register; and determining the logical address as the physical address if the logical address is not smaller than the value stored in the special register as a result of the comparing.

Further, preferably, but not necessarily, if the logical address is smaller than the value stored in the special register as a result of the comparing, the physical address is determined in an equation as below:

$$PR = \{(LR + RRB) \% R\},$$

where PR denotes the physical address of the register, LR the logical address of the register, RRB a value corresponding to the number of current iteration times stored in a base register, R the value stored in the special register, and % a modulus operator.

According to another aspect of the present invention, there is provided a data processing system comprising a compiler which determines the number of static registers and the number of rotating registers for assigning a register to a variable contained in a certain program, assigns the registers to the variable based on the number of the static registers and the number of the rotating registers, and compiles the program; and a processor which comprises a register file comprising at least one of the static registers and the rotating registers, and executes the compiled program.

Here, preferably, but not necessarily, the number of the static registers and the number of the rotating registers are determined such that the number of spill/fill codes to be generated is minimized during the executing of the compiled program.

Further, the number of the static registers and the number of the rotating registers are preferably, but not necessarily, determined for every loop contained in the program.

Further, the compiler preferably, but not necessarily, adds to the program an instruction for storing in the processor a value corresponding to the number of the rotating registers, and compiles the program.

Here, the processor may include a special register which stores the value corresponding to the number of the rotating registers; an execution unit which executes the instruction for storing in the special register the value corresponding to the number of the rotating registers; and an address translating unit which obtains a physical address for the register from a logical address of the register based on the value stored in the special register.

Further, the address translating unit may include an arithmetic unit which receives a value RRB corresponding to the number of current iteration times stored in a base register, the logical address LR of the register, and the value R stored in the special register, and outputs a value PR calculated in an equation: $PR=\{(LR+RRB) \% R\}$, where % denotes a modulus operator, a comparing unit which compares the logical address with the value stored in the special register; and a selecting unit which selectively outputs as the physical address for the register one of the value PR outputted from the arithmetic unit and the logical address of the register according to a result of the comparing of the comparing unit.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE EXEMPLARY EMBODIMENTS

Hereinafter, description will be made in detail on exemplary embodiments of the present invention with reference to the accompanying drawings. For better understanding of the present invention, detailed description on well-known structures or functions will be avoided if it is considered that concrete description on the same unnecessarily distracts the gist of the present invention.

Figure 3:
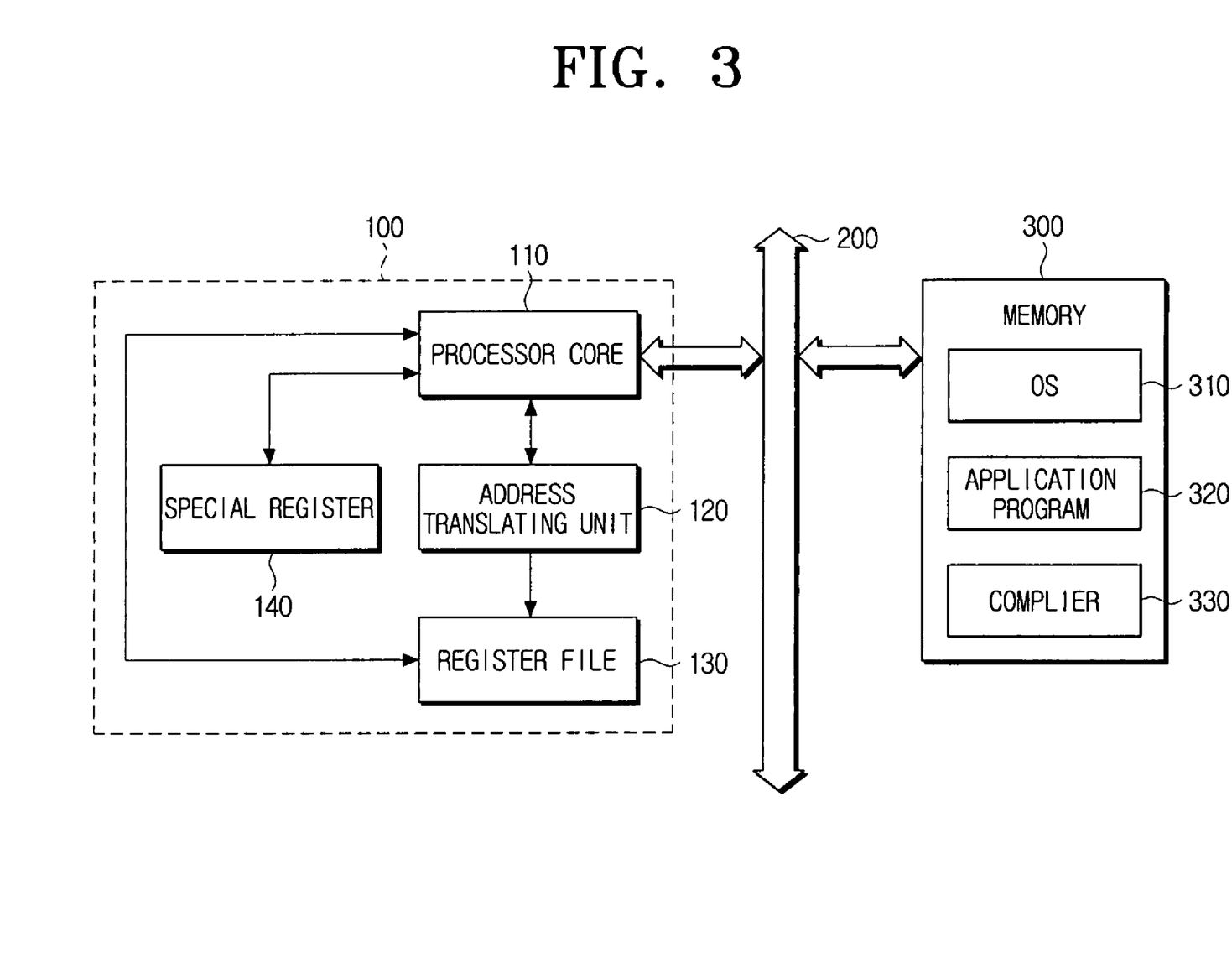
FIG. 3 is a block diagram for showing a data processing system according to an exemplary embodiment of the present invention.

FIG. 3 is a block diagram for showing a data processing system according to an exemplary embodiment of the present invention.

In FIG. 3, the data processing system according to an exemplary embodiment of the present invention includes a processor 100, a bus 200, and a memory 300. The memory 300 stores an operating system (OS) 310, application programs 320, a compiler 330, and other data, software, and so on, needed by the data processing system. The bus 200 serves as an interface for data exchange between the processor 100 and the memory 300.

The compiler 330 compiles a program to be executed on the processor 100. That is, the compiler 330 translates a program coded in a high-level language, such as C or Java, into machine instructions that the processor 100 can recognize, and can compile the program so that the processor can execute the program with software pipelining applied.

Specifically, the compiler 330 according to an exemplary embodiment of the present invention determines, based on a predetermined reference, the number of static registers $RF_S$ and the number of rotating registers $RF_R$ that are needed for assigning registers to variables contained in the program, and thus compiles the program with the register assigned to the respective variables.

Here, the compiler 330 preferably, but not necessarily, determines the number of static registers S and the number of rotating registers R such that the number of spill/fill codes to be generated is minimized while a program is executed. Further, the compiler 330 can determine the number of static registers S and the number of rotating registers R such that the number of spill/fill codes to be generated is minimized for every loop contained in a program.

The processor 100 executes the program compiled by the compiler 330.

The processor 100 according to an exemplary embodiment of the present invention contains a processor core 110, an address translating unit 120, a general register file 130, and a special register 140.

The processor core 110 patches and decodes instructions contained in the program that is stored in the memory, and then executes the decoded instructions. Particularly, the processor core 110 according to an exemplary embodiment of the present invention stores in the special register 140 a value 'R' corresponding to the number of rotating registers R during execution of the program. Although only one special register is shown in this exemplary embodiment, more special registers can be included for diverse purposes according to data processing systems.

Further, the processor core 110 accesses a register corresponding to a physical address obtained by the address translating unit 120, and stores a result of the operations into the corresponding physical register or performs operations using data stored in the corresponding physical register.

The general register file 130 can be used for various kinds of purposes, such as temporarily storing results of operations, performing arithmetic or logical operations, address indexing, and the like, and, in an exemplary embodiment of the present invention, the general register file 130 can be divided into a static register file and a rotating register file.

The static register file can be assigned to store variables having a life time not overlapped in each iteration during execution of a program loop, and the rotating register file can be assigned to the variables having a life time overlapped. In here, if the number of general register files 130 is N in total and the number of rotating registers is R, the number of static registers is N−R.

The address translating unit 120 translates a logical address of a register contained in an instruction into a physical address. Description will be made in detail on the address translating unit 120 and the general register file 130 according to an exemplary embodiment of the present invention with reference to FIG. 4.

Figure 4:
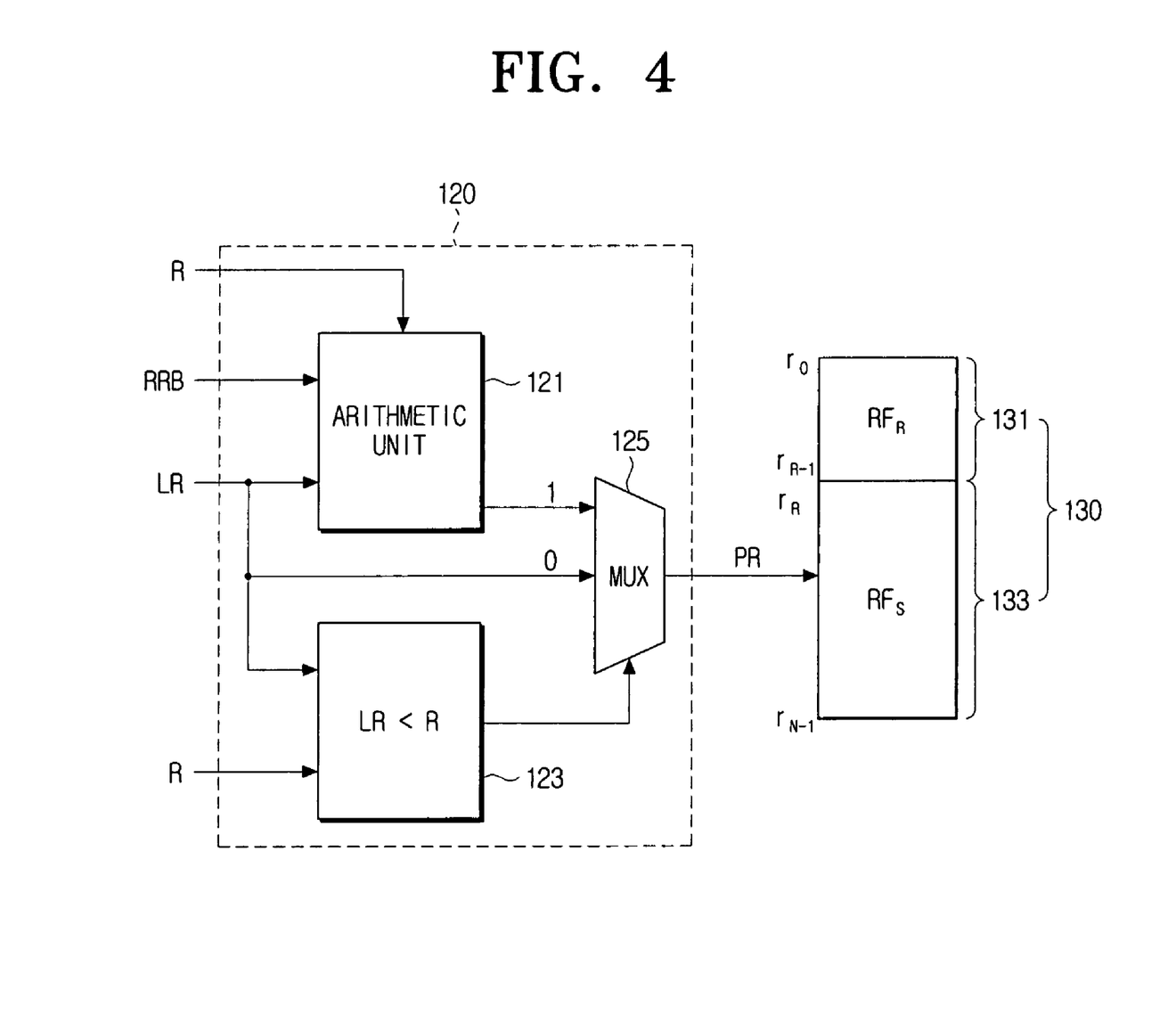
FIG. 4 is a view for showing in detail an address translating unit and a register file of FIG. 3 according to an exemplary embodiment of the present invention.

First, the general register file 130 can be divided into a rotating register file 131 and a static register file 133, as stated above. The rotating register file 131 has registers $r_0$~$r_{R-1}$, and the static register file 133 has registers $r_R$~$r_{N-1}$. That is, the number of registers used as static registers and the number of registers used as rotating registers can vary according to the value R stored in the special register 140. As above, when the number of static registers and the number of rotating registers vary, the address translating unit 120 as below is needed to obtain a physical address of a corresponding register.

The address translating unit 120 includes an arithmetic unit 121, a comparing unit 123 and a selecting unit 125.

The arithmetic unit 121 receives the number of rotating registers R of the general register file 130, a value RRB corresponding to the current iteration stored in a base register, a logical address LR of a register, and the value R stored in the special register, and outputs a value PR calculated in Equation 1 as below.

$$PR=\{(LR+RRB) \% R\}, \qquad \text{[Equation 1]}$$

where % is the modulus operator.

The comparing unit 123 receives and compares the logical address LR of a register and the value R stored in the special register. If the logical address LR of the register is smaller than the value R, the comparing unit 123 sends the selecting unit 125 a control signal for outputting the value outputted from the arithmetic unit 121 as the physical address PR of the register. Contrarily, if the logical address LR of the register is not smaller than the value R, the comparing unit 123 sends the selecting unit 125 a control signal for directly outputting the logical address LR of the register.

The selecting unit 125 can be built with a multiplexer, and selectively outputs either the value outputted from the arithmetic unit 121 or the logical addresses of the register according to a result of the comparison of the comparing unit 123.

With the configuration described above, the data processing system according to an exemplary embodiment of the present invention can optimally change and use the number of static registers and the number of rotating registers of the general register file for every program loop.

As described above, although FIG. 4 illustrates that the general register file 130 has the rotating register file 131 and the static register file 133 arranged in order of the rotating register file 131 and the static register file 133, but it is not limited to such arrangement.

For example, if arranged in order of the static register file 133 and the rotating register file 131 in the general register file 130, the static register file 133 has registers $r_0$~$r_{S-1}$, and the rotating register file 131 has registers $r_S$~$r_{N-1}$. Further, the processor core 110 stores a value 'S' corresponding to the number of static registers S into the special register 140 during execution of the program. In this case, the physical address PR of the register in Equation 1 can be modified as shown in Equation 2.

$$PR=\{(LR+RRB-S) \% (N-S)\}+S, \qquad \text{[Equation 2]}$$

where % is the modulus operator.

Figure 5:
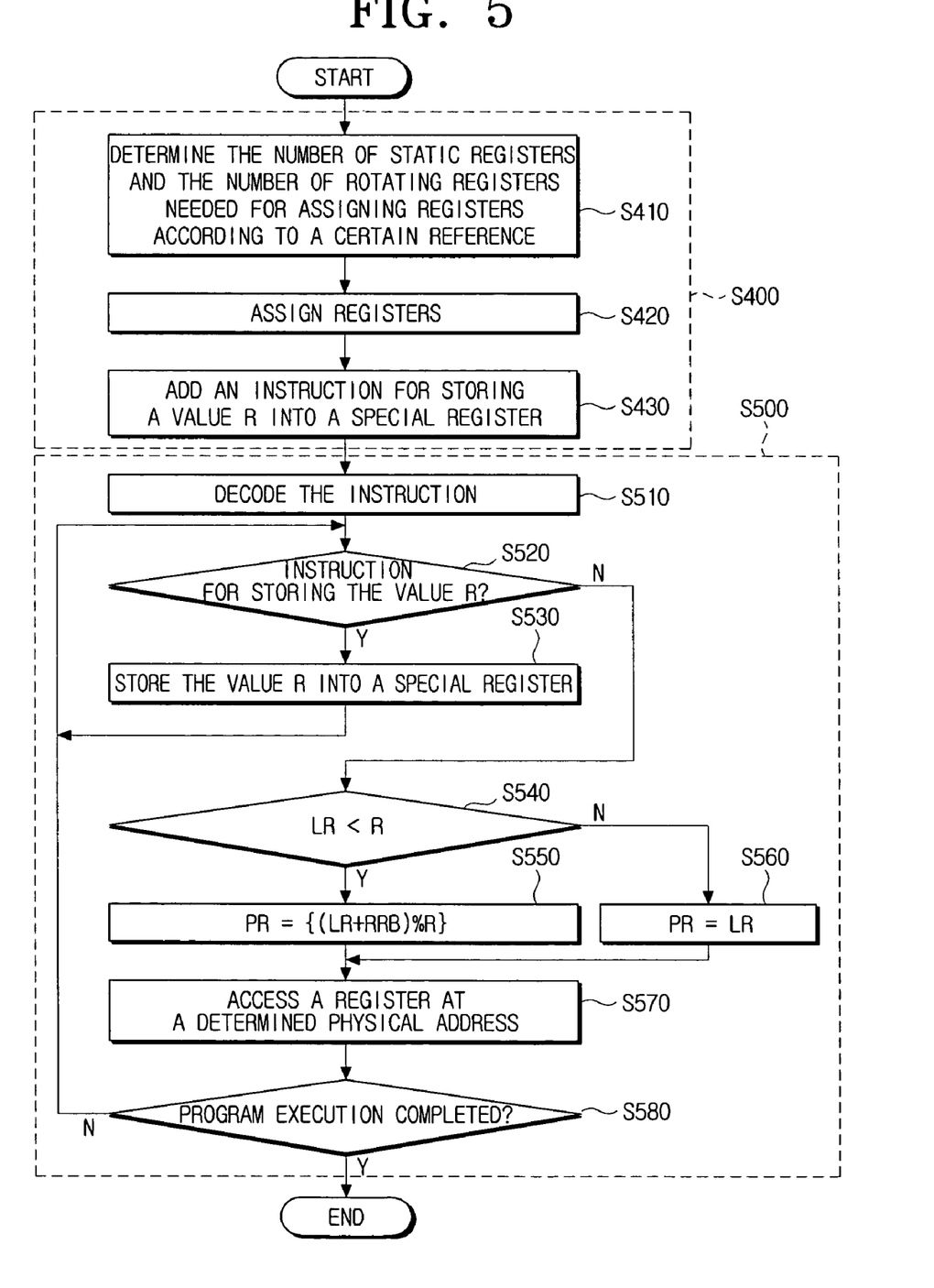
FIG. 5 is a flowchart for showing a data processing method according to an exemplary embodiment of the present invention.

FIG. 5 is a flowchart for showing a data processing method according to an exemplary embodiment of the present invention.

In FIG. 5, first, the compiler 330 determines the number of static registers and the number of rotating registers that are needed during compiling in order that a target execution program can be performed with software pipelining, and compiles the program (S400).

In more detail, the compiler 330 determines the number of static registers and the number of rotating registers R needed for assigning registers to variables contained in the program such that the number of spill/fill codes to be generated is minimized during execution of the program (S410). Here, it is preferable, but not necessary, that the number of static registers and the number of rotating registers are determined for every loop contained in a program.

Next, the compiler 330 assigns registers to the variables based on the number of static registers and the number of rotating registers which are determined (S420). Next, the compiler 330 adds to the program an instruction which instructs storing a value corresponding to the number of rotating register R determined in step S410 into the special register 140, and completes compiling (S430).

Next, the processor 100 executes the program compiled by the compiler 330 in step S400 (S500).

In more detail, first, the processor 100 patches and decodes the instructions stored in the memory 300 (S510). If the decoded instruction is an instruction for storing the value R into the special register 140 (S520-Y), the processor 100 stores the value R into the special register (S530).

Meanwhile, the address translating unit 120 compares the logical address LR of the register with the value stored in the special register 140 (S540).

As a result of the comparison, if the logical address LR is not smaller than the value R stored in the special register 140, it means that the register is a static register (S540-N), so that the address translating unit 120 determines the logical address LR itself as the physical address PR (S560). That is, a static register of the general register file 130 can be accessed based on the physical address obtained in this step.

Contrarily, if the logical address LR is smaller than the value R stored in the special register 140, it means that the register is a rotating register (S540-Y), so that the address translating unit 120 determines the physical address PR based on Equation 1 as above (S550). The physical address of the rotating register is obtained in this step. That is, a rotating register of the general register file 130 can be accessed based on the physical address obtained in this step.

Next, the processor core 110 accesses the static register or rotating register corresponding to the physical address translated by the address translating unit 140, and stores data into the register or executes an instruction in use of the data stored in the corresponding register (S570).

Finally, the processor 100 repeatedly performs steps S510 to S570 until the program is completely executed (S580).

As described above, the present invention has an advantage of efficiently using register files by dynamically controlling the number of rotating registers and the number of static registers for a software pipelined loop.

Further, the present invention has an effect capable of reducing the generations of spill/fill codes unnecessary during program execution to a minimum.

The foregoing embodiment and related aspects are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A data processing method, comprising:
   a. determining a number of static registers and a number of rotating registers for assigning a register to a variable contained in a certain program, assigning the register to the variable based on the number of the static registers and the number of the rotating registers, and compiling the certain program; and
   b. executing the compiled program,
   c. wherein the number of the static registers and the number of the rotating registers are determined for every loop contained in the compiled program, and
   d. wherein the executing of the complied program comprises obtaining a physical address for the register from a logical address of the register based on a value corresponding to a number of current iteration times stored in a base register and a value stored in a special register.

2. The method as claimed in claim 1, wherein the number of the static registers and the number of the rotating registers are determined such that a number of spill/fill codes to be generated is minimized during the executing of the compiled program.

3. The method as claimed in claim 1, wherein the executing of the compiled program comprises obtaining the physical address for the register from the logical address of the register based on at least one of the number of the static registers and the number of the rotating registers.

4. The method as claimed in claim 1, further comprising adding to the program, prior to the compiling, an instruction which instructs storing in the special register the value stored in the special register which is a value corresponding to the number of the rotating registers.

5. The method as claimed in claim 4, wherein the executing of the compiled program comprises obtaining the physical address for the register from the logical address of the register based on the value stored in the special register.

6. The method as claimed in claim 5, further comprising accessing the register corresponding to the obtained physical address.

7. The method as claimed in claim 5, wherein the obtaining of the physical address for the register comprises:
   comparing the logical address with the value stored in the special register; and
   determining the logical address as the physical address if the logical address is not smaller than the value stored in the special register as a result of the comparing.

8. The method as claimed in claim 7, wherein,
   if the logical address is smaller than the value stored in the special register as a result of the comparing, the physical address is determined in an equation as below:

$$PR=\{(LR+RRB) \% R\},$$

where PR denotes the physical address of the register, LR the logical address of the register, RRB the value corresponding to the number of current iteration times stored in the base register, R the value stored in the special register, and % a modulus operator.

9. The method as claimed in claim 1, further comprising adding to the certain program, prior to the compiling, an instruction which instructs storing in the special register a value corresponding to the number of the static registers.

10. The method as claimed in claim 9, wherein the executing of the compiled program comprises obtaining the physical address for the register from the logical address of the register based on the value stored in the special register.

11. The method as claimed in claim 10, further comprising accessing the register corresponding to the obtained physical address.

12. The method as claimed in claim 10, wherein the obtaining of the physical address for the register comprises:
   comparing the logical address with the value stored in the special register; and
   determining the logical address as the physical address if the logical address is smaller than the value stored in the special register as a result of the comparing.

13. The method as claimed in claim 12, wherein,
   if the logical address is not smaller than the value stored in the special register as a result of the comparing, the physical address is determined in an equation as below:

$$PR=\{(LR+RRB-S) \% (N-S)\}+S,$$

where PR denotes the physical address of the register, LR the logical address of the register, RRB the value corresponding to the number of current iteration times stored in the base register, R the value stored in the special register, S the number of the static registers, N a sum of the R and the S, and % a modulus operator.

14. A data processing system comprising:
   a. a compiler which determines a number of static registers and a number of rotating registers for assigning a register to a variable contained in a certain program, assigns the register to the variable based on the number of the static registers and the number of the rotating registers, and compiles the certain program; and
   b. a processor which comprises a register file comprising at least one of the static registers and the rotating registers, and executes the compiled program,
   c. wherein the number of the static registers and the number of the rotating registers are determined for every loop contained in the compiled program, and
   d. wherein the processor obtains a physical address for the register from a logical address of the register based on a value corresponding to a number of current iteration times stored in a base register and a value stored in a special register.

15. The system as claimed in claim 14, wherein the number of the static registers and the number of the rotating registers are determined such that a number of spill/fill codes to be generated is minimized during the executing of the compiled program.

16. The systems as claimed in claim 14, wherein the processor comprises an address translating unit which obtains the physical address for the register from the logical address of the register based on at least one of the number of the static registers and the number of the rotating registers.

17. The system as claimed in claim 14, wherein the compiler further adds to the certain program an instruction for storing in the processor the value stored in the special register which is a value corresponding to the number of the rotating registers, and compiles the certain program.

18. The system as claimed in claim 17, wherein the processor comprises:
   the special register which stores the value corresponding to the number of the rotating registers;
   an execution unit which executes the instruction for the storing in the special register the value corresponding to the number of the rotating registers; and
   an address translating unit which obtains the physical address for the register from the logical address of the register based on the value stored in the special register.

19. The system as claimed in claim 18, wherein the address translating unit comprises:
- an arithmetic unit which receives a value RRB corresponding to the number of current iteration times stored in the base register, LR the logical address of the register, and R the value stored in the special register, and outputs PR, a value calculated in an equation: $PR=\{(LR+RRB) \% R\}$, where % denotes a modulus operator;
- a comparing unit which compares the logical address with the value stored in the special register; and
- a selecting unit which selectively outputs as the physical address for the register one of PR, the value outputted from the arithmetic unit, and the logical address of the register according to a result of the comparing of the comparing unit.

20. The system as claimed in claim 19,
wherein the selecting unit outputs the logical address as the physical address for the register if the logical address is not smaller than the value stored in the special register, and
wherein the selecting unit outputs PR, the value outputted from the arithmetic unit, as the physical address for the register if the logical address is smaller than the value stored in the special register.

21. The system as claimed in claim 14, wherein the compiler further adds to the certain program an instruction for storing in a processor a value corresponding to the number of the static registers, and compiles the certain program.

22. The system as claimed in claim 21, wherein the processor comprises:
- the special register which stores the value corresponding to the number of the static registers;
- an execution unit which executes the instruction for the storing in the special register the value corresponding to the number of the static registers; and
- an address translating unit which obtains the physical address for the register from the logical address of the register based on the value stored in the special register.

23. The system as claimed in claim 22, wherein the address translating unit comprises:
a. an arithmetic unit which receives a value RRB corresponding to the number of current iteration times stored in the base register, LR the logical address of the register, R the value stored in the special register, S the number of the static registers, and N a sum of the R and the S, and outputs PR, a value calculated in an equation: $PR=\{(LR+RRB-S) \% (N-S)\}+S$, where % denotes a modulus operator;
b. a comparing unit which compares the logical address with the value stored in the special register; and
c. a selecting unit which selectively outputs as the physical address for the register one of PR, the value outputted from the arithmetic unit, and the logical address of the register according to a result of the comparing of the comparing unit.

24. The system as claimed in claim 23,
wherein the selecting unit outputs the logical address as the physical address for the register if the logical address is smaller than the value stored in the special register, and
wherein the selecting unit outputs PR, the value outputted from the arithmetic unit, as the physical address for the register if the logical address is not smaller than the value stored in the special register.

* * * * *